(12) United States Patent
Serrano et al.

(10) Patent No.: US 6,215,608 B1
(45) Date of Patent: Apr. 10, 2001

(54) HARDWARE INHIBIT FOR A DISK DRIVE DIGITAL SERVO CONTROL SYSTEM

(75) Inventors: Louis Joseph Serrano; Mantle Man-Hon Yu, both of San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/143,801

(22) Filed: Aug. 31, 1998

(51) Int. Cl.$^7$ .................................................. G11B 19/04
(52) U.S. Cl. ...................... 360/60; 360/77.08; 360/78.14
(58) Field of Search .................. 360/60, 49, 53, 360/77.08, 78.14, 31, 78.04, 77.02

(56) References Cited

U.S. PATENT DOCUMENTS

| | | | |
|---|---|---|---|
| 4,809,091 | * 2/1989 | Miyazawa et al. | ............. 360/60 |
| 5,126,895 | 6/1992 | Yasuda et al. | . |
| 5,208,711 | * 5/1993 | Kitamura et al. | ............. 360/60 |
| 5,270,880 | 12/1993 | Ottesen et al. | . |
| 5,521,772 | 5/1996 | Lee et al. | . |
| 5,570,244 | 10/1996 | Wiselogel | . |
| 6,046,870 | * 4/2000 | Karube | ............. 360/31 |

OTHER PUBLICATIONS

Machida Takashi, "Control Circuit for Magnetic Disk Device", Abstract from Japanese Publication 04–259964, publication date—Sep. 16, 1992.

Sakurai Yoshiki, "Magnetic Disc Device", Abstract from Japanese Publication 61–199273, publication date—Sep. 3, 1986.

* cited by examiner

Primary Examiner—Alan T. Faber
(74) Attorney, Agent, or Firm—David A. Hall; Ron Feece; Abdy Raissinia

(57) ABSTRACT

A direct access storage device that (DASD) includes a sector servo control system that controls disk write operations by receiving a servo pattern readback signal in a sector, determining track centering for that sector, and generating a write inhibit signal before any write operations are initiated for that sector. The servo control system is able to make write inhibit decisions without software processing delays, enabling the system to produce a write inhibit signal quickly after an off-track excursion, and to terminate a write inhibit decision quickly after it is no longer needed.

28 Claims, 10 Drawing Sheets

HARDWARE INHIBIT FOR A DISK DRIVE DIGITAL SERVO CONTROL SYSTEM

BACKGROUND OF THE INVENTION

1. Field of the Invention

This invention relates generally to direct access storage devices and, more particularly, to control of arm movement in disk drive devices.

2. Description of the Related Art

In a conventional computer data storage system having a rotating storage medium, such as a magnetic or magneto-optical disk, data is stored in a series of concentric or spiral tracks across the surface of the disk. A magnetic disk, for example, can comprise a disk substrate having a surface on which a magnetic material is deposited. The digital data stored on a disk is represented as a series of variations in magnetic orientation of the disk magnetic material. The variations in magnetic orientation, generally comprising reversals of magnetic flux, represent binary digits of ones and zeroes that in turn represent data. The binary digits must be read from and recorded onto the disk surface. A read/write head produces and detects variations in magnetic orientation of the magnetic material as the disk rotates relative to the head.

Conventionally, the read/write head is mounted on a disk arm that is moved across the disk by a servo. A disk drive servo control system controls movement of the disk arm across the surface of the disk to move the read/write head from data track to data track and, once over a selected track, to maintain the head in a path centered over the selected track. Maintaining the head centered over a track facilitates accurate reading and recording of data. Positioning read/write heads is one of the most critical aspects of recording and retrieving data in disk storage systems. With the very high track density of current disk drives, even the smallest head positioning error can potentially cause a loss of data that a disk drive customer wants to record or read. Accordingly, a great deal of effort is devoted to servo control systems.

A servo control system generally moves a read/write head to a desired track and maintains the head in a position centered over that track by reading servo information recorded on the disk surface. The servo information comprises track identification information and a position-encoded servo pattern of high frequency magnetic flux transitions, generally flux reversals, that are pre-recorded in disk servo tracks. The flux transitions are recorded as periodic servo pattern bursts formed as parallel stripes in the servo tracks. When the read/write head passes over the servo pattern flux transitions, the head generates an analog signal whose repeating cyclic variations can be demodulated and decoded to indicate the position of the head over the disk. The position indicating information can be used to produce a corrective signal that is referred to as a position error sensing (PES) signal. The PES signal indicates which direction the head should be moved to remain centered over a selected track and properly read and write data.

In the sector servo method of providing servo track information, each disk surface is divided into angularly-spaced sectors, with each sector containing both pre-recorded servo track information and customer data. Typically, the tracks on a sector servo disk are partitioned by having a short servo track information area followed by a customer data area. FIG. 1 illustrates a portion of a track 102 from a conventional sector servo disk, showing a servo track information area and the customer data area that follows.

The servo track information area typically includes a servo mark field 104 that indicates servo information follows in the track, and also serves an automatic gain control (AGC) function. The servo mark is followed by a sector identification field 106, and then a gray code field 108 that provides track number information. Next, a servo pattern field 110 contains a servo burst pattern. A synchronization field 112 then immediately precedes a customer data field 114, where disk users read and write their data. The servo read head is typically the same head used for reading the customer data.

In the FIG. 1 illustration, the servo burst pattern 110 is indicated as a quadrature pattern having four servo bursts labeled A, B, C, and D. Those skilled in the art will understand that the servo bursts will, when decoded, produce the PES signal described above. After a seek operation to move the read/write head to a desired track, a conventional digital servo control system generates a write inhibit signal that will prevent any data recording if the read/write head is not at the proper track and if it is away from the track centerline by more than a threshold limit. The servo control system typically achieves the write inhibit by shutting off the write gate of a write control processor, thereby preventing off-track write operations.

A conventional servo control system determines when the write inhibit signal should be produced by performing a series of steps that are implemented in software. First, the servo controller receives the servo track information, including the PES servo pattern burst signal, and calculates the distance of the read/write head from the track centerline. If the head is not at the desired track, no write occurs. If the head is offset from the track centerline by more than a predetermined threshold, the controller shuts off the write gate, preventing any write operations. Unfortunately, such software processing necessarily creates a delay in actually posting the write inhibit. Several operating cycles of the servo controller central processor clock may pass before the readback signal is demodulated, the off-track distance is calculated, and the distance is compared to the predetermined threshold to make the write inhibit decision. That is, if the read/write head is off-track, this fact is not detected until the next sector servo interval, after the servo burst has been transduced, the quadrature pattern has been demodulated, and the off-track distance determined.

The time delay imposed by the software-determined write inhibit scheme has two bad effects. First, the read/write head will likely be moved even farther away from the track center while the servo information is being processed and the write inhibit decision is being made. Second, the write inhibit decision from a prior sector may persist into the next following sector, so that the write inhibit will last too long. If a write inhibit decision could be processed and implemented during the same sector for which position information is transduced, an off-track excursion could be detected quickly after the head position moved out of tolerance, and a write inhibit decision could be cut off quickly after it is no longer needed.

From the discussion above, it should be apparent that there is a need for a disk drive servo control system that can provide write inhibit decision making without software processing delays, can produce a write inhibit decision quickly after an off-track excursion, and can terminate a write inhibit decision quickly after it is no longer needed. The present invention fulfills this need.

SUMMARY OF THE INVENTION

The present invention provides a direct access storage device (DASD) with a sector servo control system that controls disk write operations by detecting a servo pattern in a sector, determining track centering for that sector, and generating a write inhibit signal before any write operations are initiated for that sector. In this way, the servo control system is able to make write inhibit decisions without software processing delays typical of conventional digital servo control systems, enabling the system to produce a write inhibit signal quickly after an off-track excursion, and to terminate a write inhibit decision quickly after it is no longer needed.

In accordance with the invention, the servo control system includes servo signal processing circuitry that receives the readback signal from the disk read/write head and determines if a write inhibit is called for. The readback signal is generated from a sector format that positions the servo pattern sufficiently from the end of the sector servo information field that the readback signal can be processed and a write inhibit signal produced before the write operation would begin for that sector. This ensures timely processing of the write inhibit decision for each sector.

In one aspect of the invention, the tracks of the disk are assigned one of a multiple of track types. Thus, each track on the disk has a corresponding assigned track type. The servo signal processing circuitry decodes the track type of the track at which the head is positioned and compares it to the track type of the desired track, called the target track. If the target track type does not match the actual decoded track type, then the head is not centered on the proper track and the processing circuitry generates a write inhibit signal. Offset error threshold limits can be incorporated into the processing circuitry, so that a write inhibit occurs within error limits that do not directly correspond with the servo track boundaries. In this way, the write inhibit signal can be produced without performing software processing steps and can be produced for each track sector before the customer data area is encountered in that sector.

Other features and advantages of the present invention should be apparent from the following description of the preferred embodiment, which illustrates, by way of example, the principles of the invention

DESCRIPTION OF THE PREFERRED EMBODIMENTS

Figure 2:
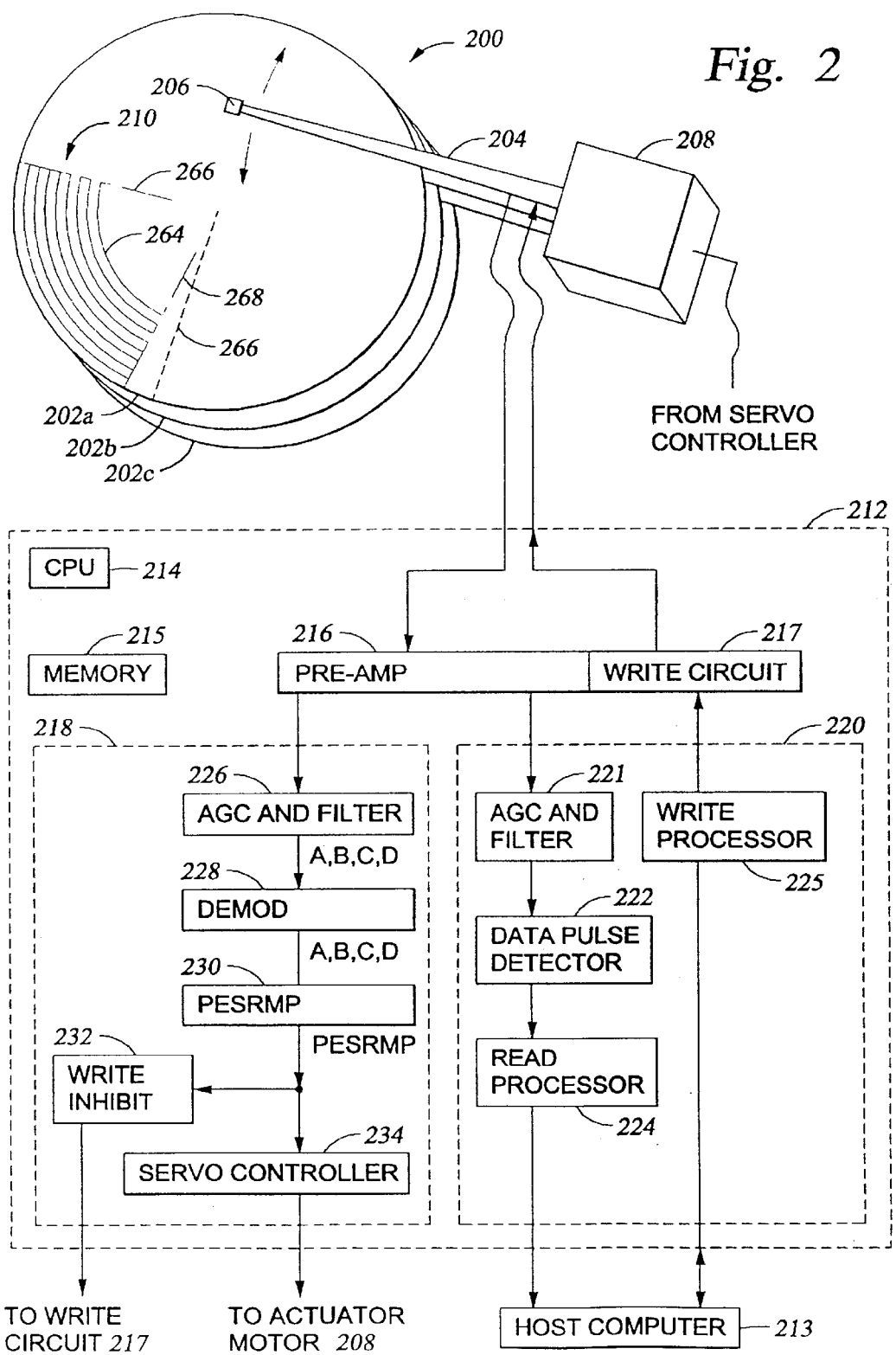
FIG. 2 is a representation of a multiple-disk, multiple-head conventional disk drive storage system in accordance with the present invention.

FIG. 2 illustrates an exemplary direct access storage device (DASD) 200 comprising a disk drive constructed in accordance with the present invention. The DASD includes multiple disks whose top surfaces 202a, 202b, 202c are shown and on which are deposited a magnetic recording material for storing magnetically encoded information. It should be understood that the bottom surfaces of the disks have a similar construction. Although three disks are indicated in FIG. 2, it should be understood that the invention has applicability to disk drive systems with any number of disks consistent with the following description of operation. A reference to a single disk 202 should be understood to be a reference to the disks collectively. Moreover, where the device 200 is described with respect to one of the disks for ease of explanation, it should be understood that the description applies to each of the disks.

In accordance with the invention, read/write heads are moved across the disks 202 according to a sector servo control system wherein the disks are divided into radial segments comprising servo information areas and customer data areas. The servo information areas contain servo information having a prerecorded servo pattern, and the customer data areas are used for recording and reading user data. The servo information is arranged in the sector such that, in conjunction with write inhibit circuitry, a write inhibit signal can be produced for a given servo sector before the read/write head encounters the customer data area of the same sector. Servo burst values from the servo information areas are used to generate a position error sensing (PES) signal.

In the preferred embodiment, the PES data is received by the write inhibit circuit (described further below) and a track type is determined. The track type and servo burst values are used to determine a PES ramp signal and to compare the determined track type against the known target track type that corresponds to the track in question. In the preferred embodiment, if the target track type does not match the actual determined track type, then a write inhibit signal is produced and no write operation takes place in the current sector for the track in question. Alternatively, a write inhibit signal can be produced only if the PES ramp signal indicates a read/write head position that exceeds a predetermined threshold value.

Figure 3:
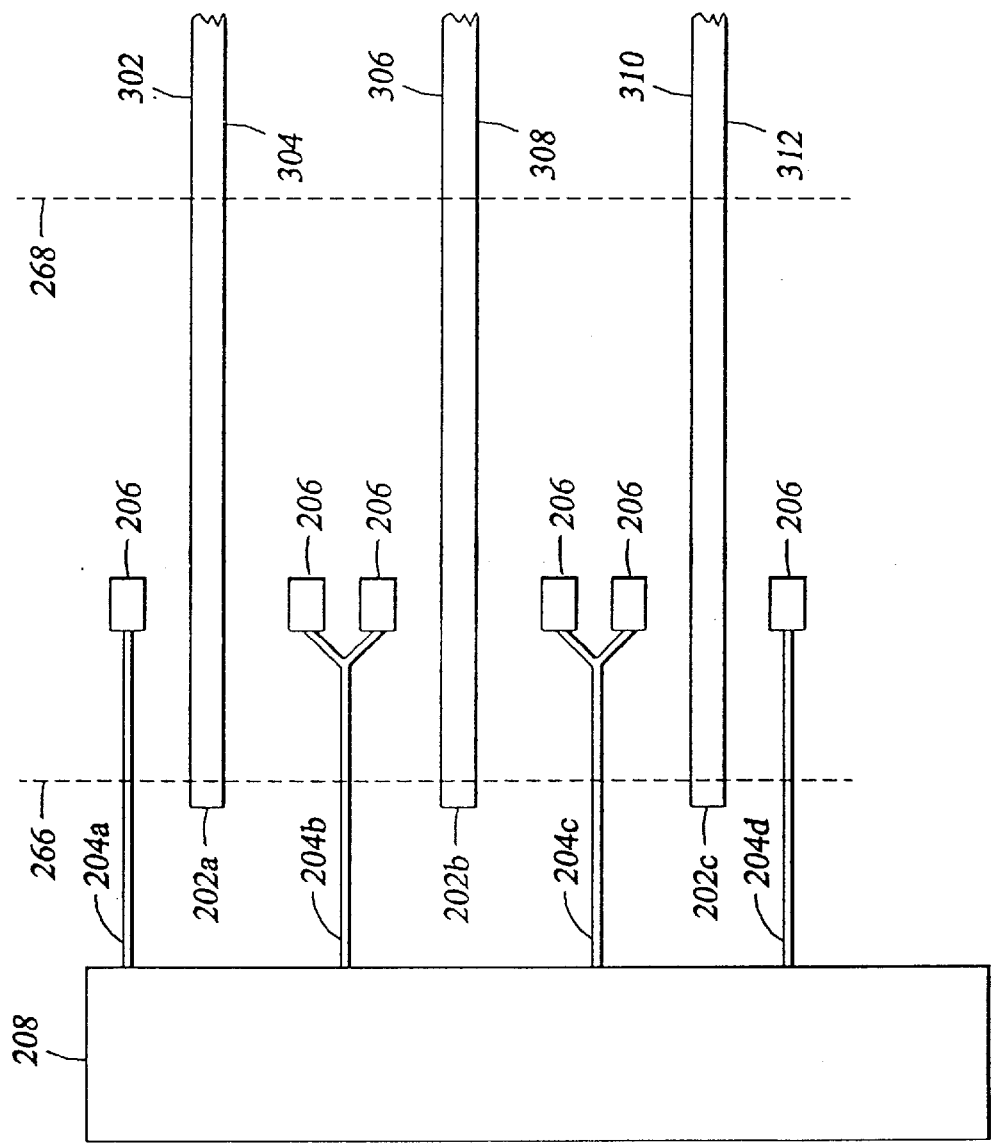
FIG. 3 is side elevational view of the disk surfaces and arms in the disk drive storage control system illustrated in FIG. 1.

The exemplary system 200 contains three disks arranged in a coaxial fashion. Each disk has a top surface and a bottom surface, and so the three-disk system has six surfaces on which information can be recorded. FIG. 3 is a side elevation view of the six disk surfaces. The first disk 202a has a top surface 302 and a bottom surface 304. The second disk 202b has a top surface 306 and a bottom surface 308, and the third disk 202c has a top surface 310 and a bottom surface 312. The exemplary system 200 makes use of some actuator arms that have double-suspension read/write heads, and therefore all six surfaces 302–312 can be accessed with a total of only four arms, as shown in FIG. 3. The separation of disks and heads is exaggerated in FIG. 3 for clarity of presentation. As with the disks 202, the four arms 204a, 204b, 204c, 204d will be referred to collectively with one reference numeral 204. Each disk surface is provided with a read/write head 206 for transducing recorded information from the disk surfaces and for recording information onto the disk surfaces. An actuator motor 208 pivots all of the actuator arms 204 simultaneously, thereby changing the position of all the read/write heads 206 across the disks 202. The actuator motor is typically constructed as a voice coil motor (VCM).

With reference again to FIG. 2, the first disk 202a is shown with concentric tracks 210 of information for a portion of disk 202a. Movement of the disk arms 204 is indicated by the arrows extending across the disk. Although rotary movement of the arms 204 is depicted for illustrative purposes, the disk drive system 200 may alternatively use another positioning scheme, such as linear extension/retraction of the arms. In FIG. 2, parallel circular lines 264 represent tracks of the disk, and dashed radial lines 266 represent sector-defining lines.

A sector servo information area is defined in the area of a sector between a sector line 266 and a delimiting line 268 located toward one radial edge of the sector. In alternative embodiments, the dashed radial lines 266 and 268 may be curved. Servo track information is recorded in the sector servo information area, and customer data can be recorded in the disk area corresponding to the remainder of the sector.

Figure 1:
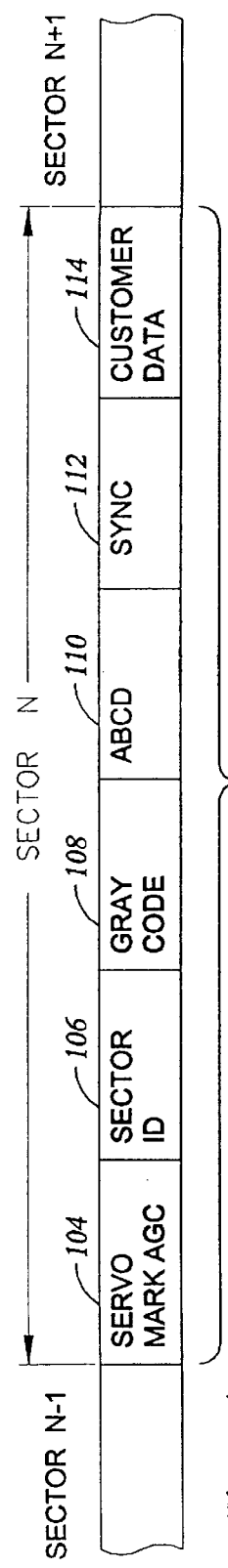
FIG. 1 is a schematic representation of a prior art sector servo format for a section of a track in a disk drive storage system.
Figure 4:
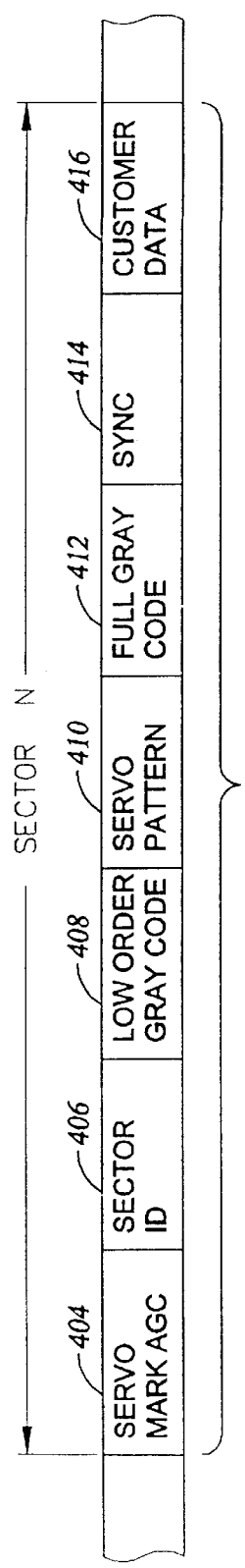
FIG. 4 is a schematic representation of a sector format for a track in the disk drive storage system of FIG. 2.

FIG. 4 is a representation of the sector format for a track 402 of the disk. FIG. 4 shows that the servo track information includes a sector marker AGC field 404, a sector ID field 406, a low-order gray code field 408 for track identification data, a servo pattern area 410, the full gray code information 412, and a synchronization field 414. The gray code fields 408, 412 represent a particular encoding of the track identification information, and it should be understood that alternative encoding of the track identification information is possible without departing from the teachings of the invention. The sync field 414 indicates that customer data 416 follows in the track. Thus, the sector format shown in FIG. 4 positions the servo pattern field 410 sufficiently from the end of the servo track information field that the readback signal can be processed and a write inhibit signal generated before the customer data write operation would begin for that sector. This ensures timely processing of the write inhibit decision for each sector.

Referring back to FIG. 2, the operation of the DASD disk drive 200 is managed by a disk drive controller 212, which also serves as an interface between the disk drive and a host computer 213. The host computer may comprise, for example, a desktop computer, a laptop computer, a mainframe computer, or any other digital processing device for which storage of data on a disk is desired. The disk drive controller 212 includes a central processor unit (CPU) 214 that executes program instructions stored in controller memory 215 to implement the desired operation, as described below.

The disk drive controller 212 includes a readback signal pre-amplifier circuit 216 ("pre-amp"), which receives electrical representations of servo patterns sensed by the read/write heads 206 from the disks 202. The pre-amp 216 serves a dual purpose by amplifying either data signals or servo signals, depending on whether the associated read/write head 206 is positioned over stored customer data or over servo pattern data, respectively. Thus, the amplified signal from the pre-amp 216 is directed to two processing channels: a servo channel 218 and a customer data channel 220. A write circuit 217 is provided to supply the read/write head 206 with customer data signals from the data channel 220, after formatting by the write processor 225.

The data channel 220 generally reads and writes data to and from the disk 202 in response to requests from the host computer 213 to read or write the customer data. The write circuit 217 is connected only to the customer data channel 220. The pre-amp 216b, when operating in conjunction with the customer data channel, amplifies the disk readback signal from the read/write head 206 and directs the readback signal to an automatic gain control and filter circuit 221. A data pulse detector 222 receives the analog readback signal from the circuit 221 and forms digital data pulses corresponding to the analog signal. Next, a read processor 224 converts the data pulses into formatted data strings that are compatible with the host computer 213. The data channel 220 operates in reverse order to write customer data to the disk 202, receiving data from the host computer 213 at a write processor 225 of the data channel 220. In the absence of a write inhibit signal, the write processor formats the data and provides it to the write circuit 217, where the formatted data is recorded onto the disk 202 by the head 206.

The servo channel 218 generally reads servo data from the disk 202 to aid in properly positioning the read/write heads 206. When operating in conjunction with the servo channel 218, the pre-amp 216 amplifies servo signals produced when the read/write heads 206 sense servo patterns. In the preferred embodiment, the servo pattern is a repeating four-field pattern commonly referred to as a quadrature pattern.

Figure 5:
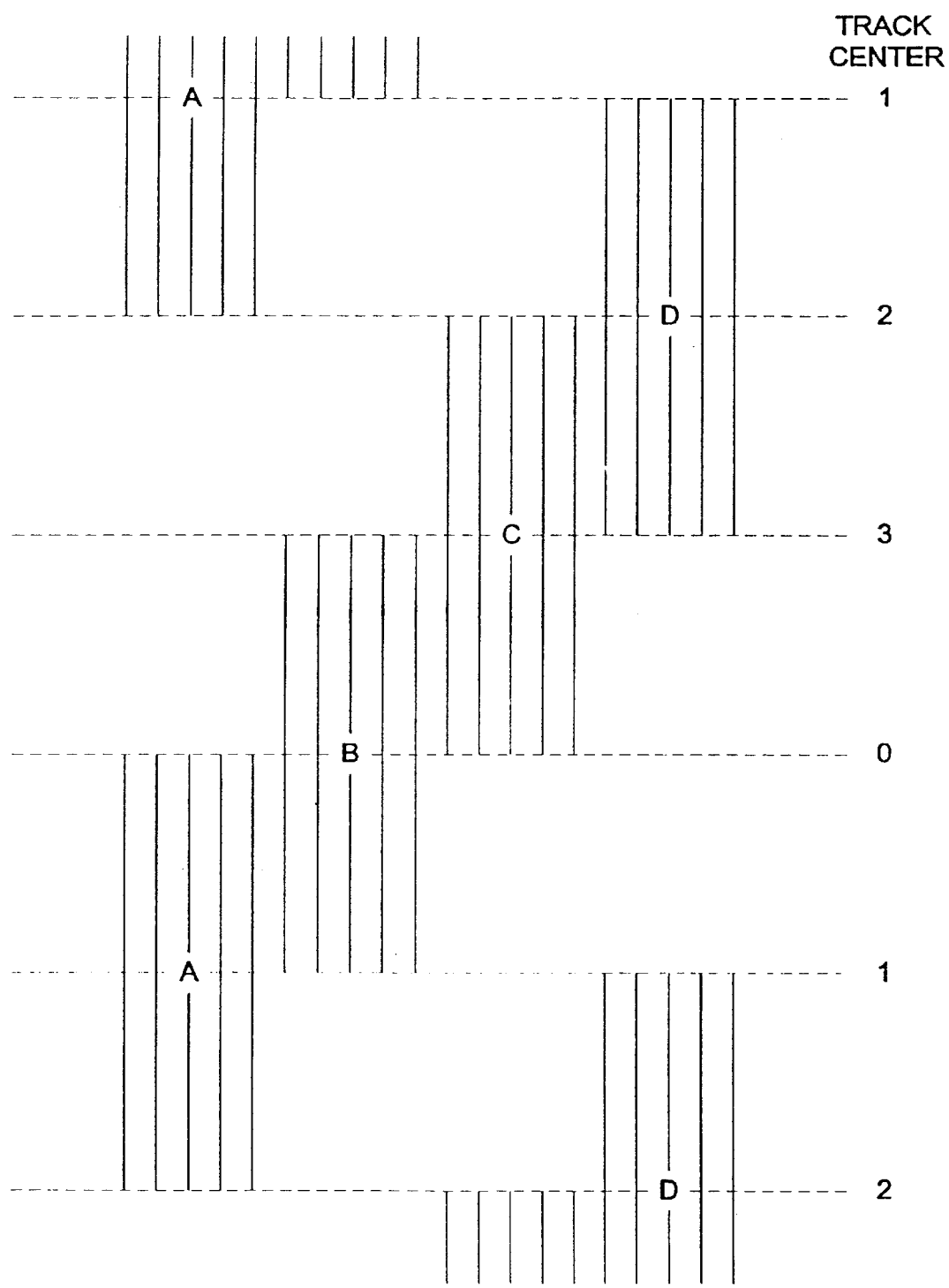
FIG. 5 is a representation of the PES servo pattern for a track in the disk drive storage system of FIG. 2.

FIG. 5 is an illustration of the quadrature pattern showing repeating fields labeled A, B, C, and D. Those skilled in the art will understand that the readback signal from the head comprises transduced A, B, C, D servo burst patterns of the type illustrated in FIG. 5, represented by vertical lines.

Returning once again to FIG. 2, the servo channel 218 includes an automatic gain control (AGC) and filter circuit 226, which may comprise any one of various known circuits for automatically adjusting the readback signal gain and filtering it. The output of the AGC and filter circuit comprises processed analog A, B, C, D servo pattern data. Next, a demodulator 228 receives the analog readback signal and derives digital A, B, C, D servo burst values and a digital representation of track identification information. The digital servo burst values are next provided to a PESRMP block 230, which processes the data and derives P and Q quadrature data, from which a position error sensing (PES) signal and PES ramp (PESRMP) signal are generated. Those skilled in the art will understand how to derive the P and Q data and how to generate the PES signal and PESRMP signal, without further explanation. Those skilled in the art will also understand that the PES signal is related to the position of the read/write head 206 with respect to the desired track center and is indicative of the read/write head position error.

In the preferred embodiment of the invention, the PESRMP signal is provided from the PESRMP circuit 230 to a write inhibit detection circuit 232 and to a servo controller 234. The servo controller operates in accordance with program steps stored in the controller memory 215, which are executed under control of the CPU 214 to implement the desired operation of the servo controller. The servo controller generates control signals that are provided to the actuator motor 208 to control movement of the read/write heads 206 across the disks in track seeking and track following. As noted above, a write inhibit signal is produced from the write inhibit detection circuit 232 for a given sector before the read/write head encounters the customer data area of the same sector. If desired, the write inhibit detection circuit 232 can be located off-chip, between the servo channel 218 and the write processor 225 of the write channel 220.

In the preferred embodiment, the PESRMP circuit 230 produces a target type (TT) signal and a PES ramp (PESRMP) signal, and then the TT signal is processed by the write inhibit detection circuit 232 to produce a write inhibit signal that is delivered to the write circuit 217. The TT signal contains track type data and the PESRMP signal contains position data. The write inhibit signal prevents write operations from taking place that otherwise would load data from the write processor 225 and write the data to the disks 202.

More particularly, each track of the disks is associated with a predetermined track type such that the track type decoded from the PES information of a track will indicate the predetermined track type if the read/write head is centered over that track. If the decoded track type does not match the target track type, then a write inhibit signal is produced and no write operation takes place in the current sector for that track. Thus, the write inhibit signal from the write inhibit detection circuit 232 will prevent writing of data that otherwise would take place under control of the write processor. Alternatively, the TT signal and PESRMP signal can be provided directly to the write processor 225, which then processes the signals to reach an inhibit/no inhibit decision, or the write inhibit detection circuitry can be incorporated into the write circuit 217.

Figure 6:
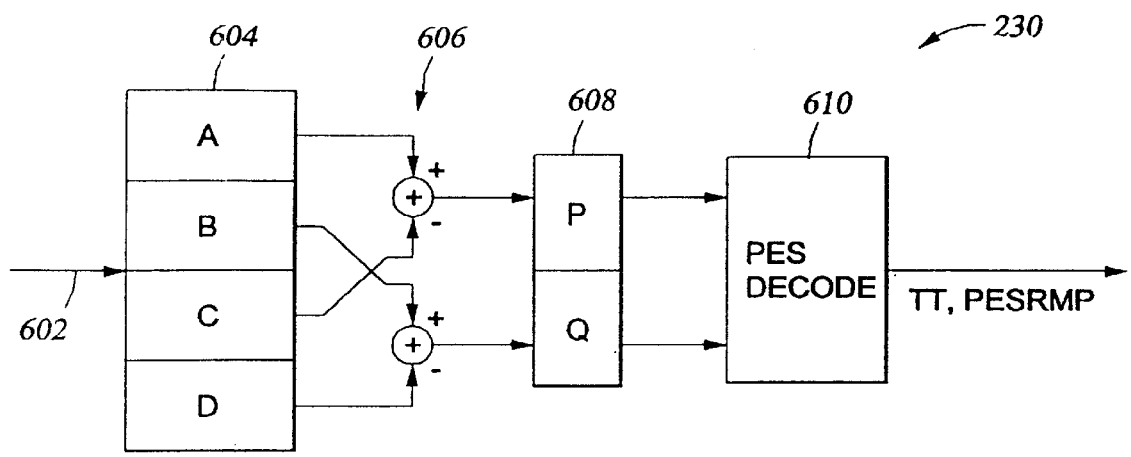
FIG. 6 is a schematic diagram of a track type and PES ramp decode circuit of the disk drive storage system illustrated in FIG. 2.

FIG. 6 is a schematic diagram of a PESRMP circuit 230 that receives the servo information from the demodulator 228 (see FIG. 2) and provides the TT signal and the PESRMP signal for the disk drive storage system 200. In the preferred embodiment, the demodulator 228 receives the analog A, B, C, D servo information signal over an input line 602 and converts it to a digital representation. The converted servo information comprises a digital representation of the four A, B, C, D quadrature servo bursts illustrated in FIG. 5. Appropriate circuitry places the received servo information signal in the proper register of a register bank 604, with a different register for each A, B, C, and D value. In accordance with known demodulation techniques, the A, B, C, D quadrature values are operated on with summers 606 to produce the P and Q values of the PES signal, as indicated. The P and Q values are stored in PES registers 608. The PES registers 608 provide their P and Q values to a PES decode circuit 610 that produces the PESRMP signal and the TT signal described above.

Figure 7:
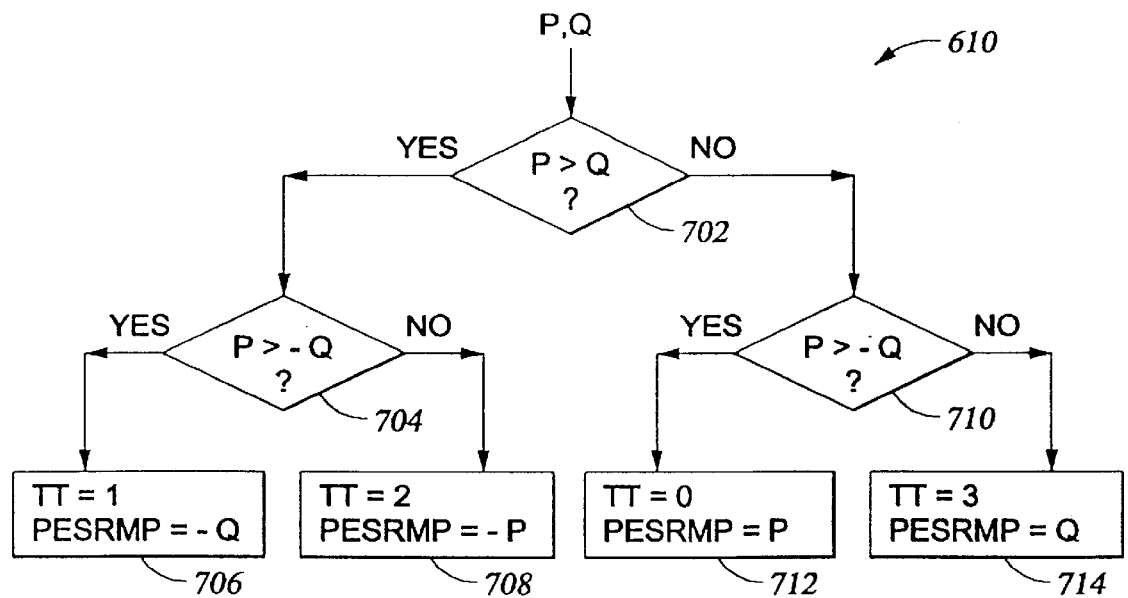
FIG. 7 is a block diagram representation of the processing performed by the decode circuit illustrated in FIG. 6.

FIG. 7 is a block diagram representation of the processing carried out by the PES decode circuit 610 of FIG. 6. It should be understood that other PES decode schemes are possible, so long as the correct determination is made for target type and PES ramp signal values, as next described. In the preferred embodiment, the decode circuit first compares the values for P and Q, as indicated by the first comparison block 702. If P is greater than Q, an affirmative outcome, then P is next compared against the −Q value at the box 704. If P is greater than −Q (indicating P has a greater absolute value), then the indicated target type (for this embodiment) is determined to be a first target type, indicated in the outcome box numbered 706 by "TT=1", and the PESRMP signal is set to −Q, indicated in the box 706 by "PESRMP=−Q". If P is not greater than −Q, a negative outcome at the decision box 704 indicating that Q has the greater absolute value, then the target type is set to the "2" type, as indicated in the box numbered 708 by "TT=2", and the PESRMP signal is set to −P.

In FIG. 7, if P is not greater than Q, a negative outcome at the first decision box 702, and if P is greater than −Q, an affirmative outcome at the decision box 710, then the target type is set to "0" and the PESRMP signal is set to P. This is indicated in the outcome box 712 by TT=0 and PESRMP=P. If P is not greater than −Q (a negative outcome at the decision box 710), then Q has the greater absolute value, and the target type is set to "3" and the PESRMP is set to Q. This is indicated at the outcome box 714 by TT=3 and PESRMP=Q.

As noted above, decode schemes other than those illustrated in FIG. 7 are possible, so long as the target type and PES ramp signal values are correct. For example, the FIG. 7 processing is an implementation of the quadrature A, B, C, D servo pattern wherein P=A−C and Q=B−D, but an alternative servo pattern scheme might use a different arrangement where P=A−B and Q=B−C. Such alternative schemes will occur to those skilled in the art, without further explanation.

The write inhibit signal that is generated by the write inhibit detection circuit 232 (FIG. 2) can be generated by circuitry in a variety of ways, after the target types are assigned by the system designer. If the target type boundaries define the limits of off-track excursions for which write operations are permitted, then any indication that a target track type does not match the track type determined from the PES data will result in a write inhibit signal that halts write operations by the write processor 225. If the limits of permitted off-track excursions coincide with the track type boundaries, then the write inhibit signal is determined immediately upon decoding the TT value from the PES readback signal. It should be noted that it is not necessary to decode the PESRMP signal if the target type boundaries exactly match the write boundaries.

If the track region where writing is permitted extends beyond the track type boundaries, then the write inhibit signal cannot be determined until after the PESRMP signal is compared against a high threshold (in the track toward the inside diameter of a disk) and also compared against a low threshold (in the track toward the outside diameter of a disk). For a given track, a write inhibit signal will be produced if the PESRMP signal exceeds the high threshold, or if the PESRMP signal falls below the low threshold.

Figure 8:
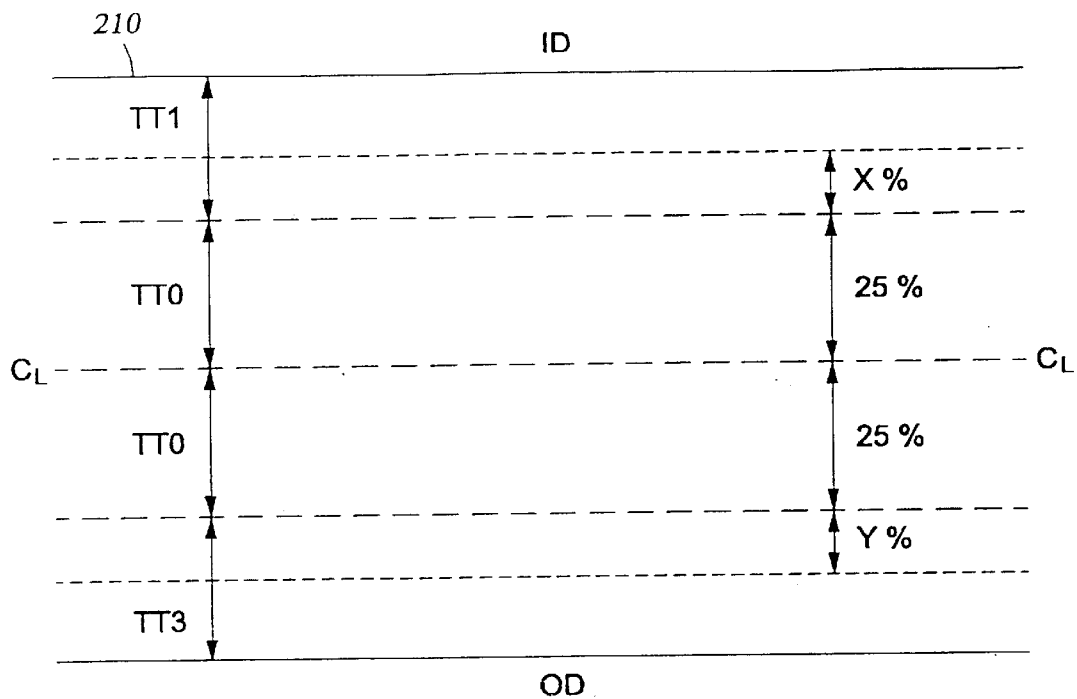
FIG. 8 is a representation of track types relative to a customer data track of a disk in the FIG. 2 system, with write threshold boundaries indicated.

FIG. 8 illustrates the write thresholds graphically for a disk track 210 of the storage system 200 shown in FIG. 2. In FIG. 8, a portion of a single customer data track is shown, with the track centerline indicated with a $C_L$ dashed line. In this exemplary system, four track types are defined such that, for the track illustrated in FIG. 8, a PES readback signal that is decoded will indicate a track type signal of "TT=0" if the read/write head is positioned over the middle 50% of the track (that is, 25% on either side of the track centerline). Those skilled in the art will understand that, in the case of either data track adjacent to the one illustrated in FIG. 8, a decoded PES signal will indicate a track type of "TT=2" for a centered read/write head. Other tracks will be similarly decoded for the quadrature PES pattern.

If the write threshold of the system is selected to correspond exactly to the track type boundaries, then if the decoded PES track type is the same track type (for the illustrated track, TT=0) as that of the target track type, then write operations will be permitted. If the decoded track type is different from the target track type, then a write inhibit signal will be generated and write operations will be inhibited. This situation can be seen for the two lateral track areas indicated in FIG. 8 as TT0. Often, the track area will not be equal to the track type boundaries. In this case, the permissible write area will be less than or equal to the track type boundaries. Also in this case, it will be necessary to incorporate limit threshold processing in the write inhibit detection before a write inhibit signal is produced. To incorporate limit threshold processing, a high and low limit threshold value must be processed, along with the PESRMP signal. A write inhibit detection circuit to perform such processing is illustrated in FIG. 9.

To process the PESRMP signal with the target type determination, the write inhibit detection circuit 232 must compare the PESRMP signal value against a threshold value that defines an upper limit (conventionally, toward the outer disk diameter OD) and must compare the PESRMP signal value against a lower limit (conventionally, toward the disk inner diameter ID). A write inhibit decision will occur if the PESRMP signal is greater than the upper threshold and will occur if the PESRMP signal is below the lower threshold.

Figure 9:
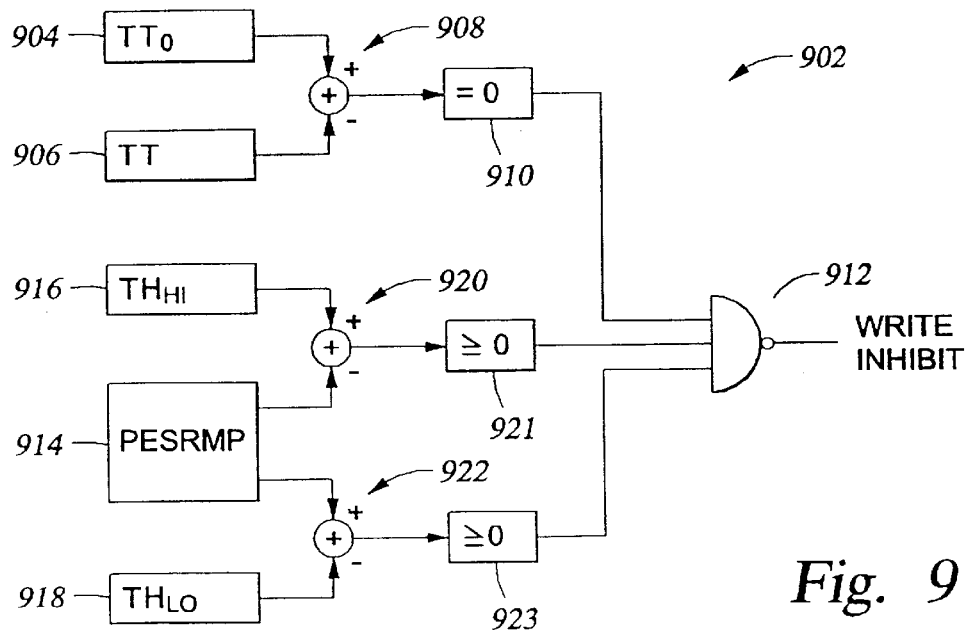
FIG. 9 is a schematic diagram of a write inhibit circuit of the disk drive storage system illustrated in FIG. 2.

FIG. 9 shows a logic circuit 902 that can implement the write inhibit detection decision making described for the upper and lower write thresholds within a single track type. The logic circuit 902 is contained within the write inhibit detection block 232 of FIG. 2. The target track type signal (TT=0 in this case) is provided to a first register 904 and the actual track type TT is read out from a second register 906. Both signals are provided to a difference summer 908. The FIG. 9 circuit shows a circuit element 910 that represents the condition where the signals are equal; that is, the summed difference is equal to zero. That signal output is provided as one input to a three-input NAND gate 912. The other processing path makes use of the PESRMP signal, read out from a PESRMP register 914. A value representing the high threshold value ($TH_{HI}$) is received from a register 916 and a value representing the low threshold value ($TH_{LO}$) is received from another register 918.

The $TH_{HI}$ value and PESRMP signal value are compared in a summer 920 and the output for a non-zero outcome at box 921 is provided as another input to the NAND gate 912. The $TH_{LO}$ value and the PESRMP signal value are compared in a summer 922 and the output for a non-zero outcome at box 923 is provided as the last input to the NAND gate. The output of the NAND gate provides the write inhibit signal.

The FIG. 9 circuit implements a permissible write area that is less than or equal to the track type boundaries for a single track type. Alternatively, the permissible write area may extend over multiple track types, beyond the boundaries for a single track type. This may be desired in some disk topologies, such as where a single customer data track is defined over multiple servo tracks. In that case, multiple track type data must be decoded and processed to produce the write inhibit signal. Such a situation is illustrated in FIG. 8, toward the right edge of the drawing figure.

FIG. 8 also graphically shows a write threshold that extends beyond the track type boundaries. At the right side and top edge of the drawing figure, an area is indicated as "x %", extending beyond the track type boundary for TT=0 toward the disk inside diameter (ID). At the bottom edge of the drawing figure, an area of y % is indicated, extending beyond the track type boundary for TT=0 toward the disk outer diameter (OD). The x % and y % values will typically define symmetric limits, such as +/−5%. In the case of permissible write boundaries that extend beyond the track type boundaries, the write inhibit outcome is not known before the track type data and PESRMP signal are processed. A circuit to accomplish this processing is illustrated in FIG. 10.

Figure 10:
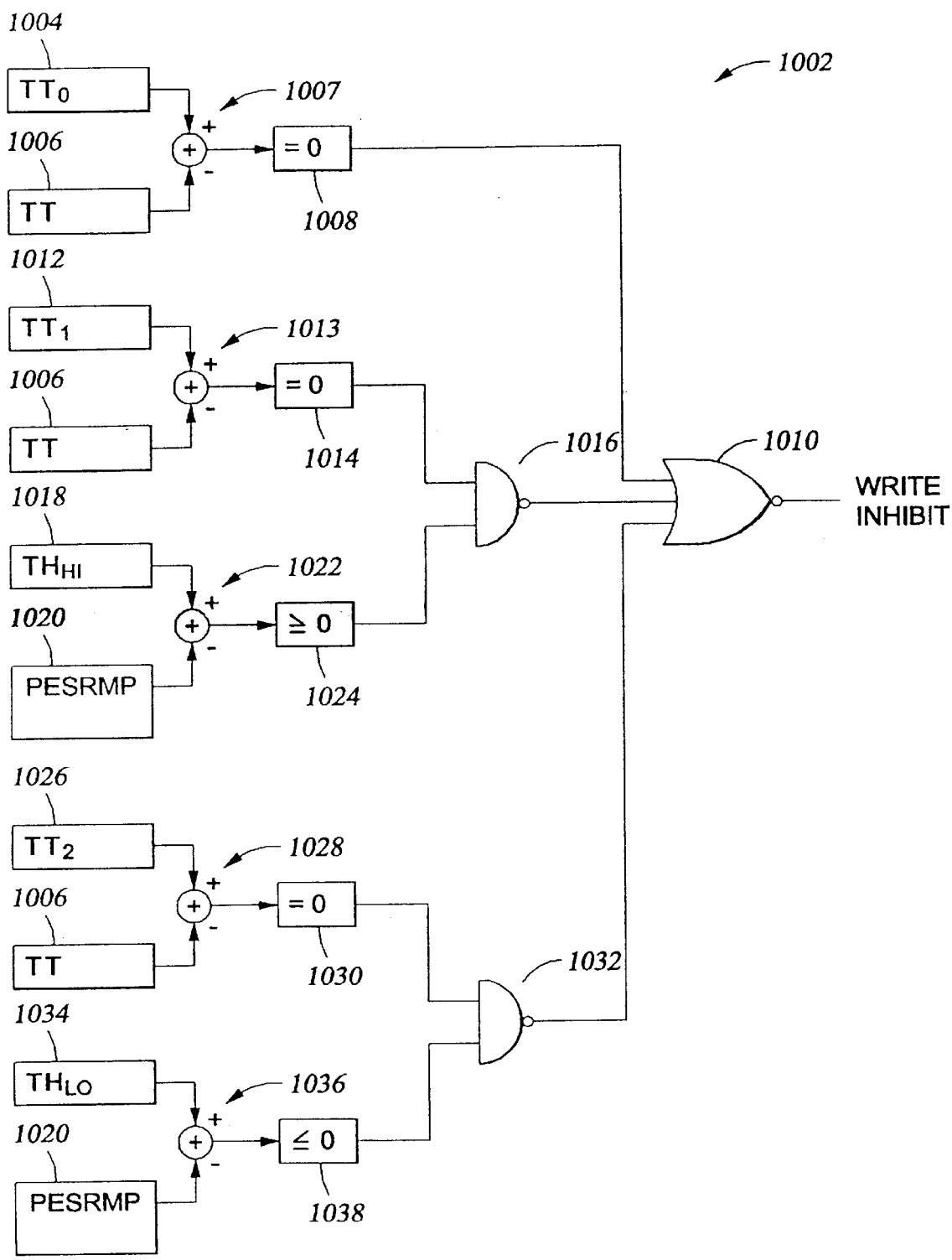
FIG. 10 is a schematic diagram of an alternative write inhibit circuit for the disk drive storage system illustrated in FIG. 2.

FIG. 10 shows a logic circuit 1002 that can implement the write inhibit detection decision making described for the write inhibit areas of x % and y % shown in FIG. 8. The logic circuit 1002 would be contained within the write inhibit detection block 232 of FIG. 2. In the FIG. 10 embodiment of the write inhibit detection, track type signals for TT0, TT1, and TT2 are utilized and compared with the actual decoded track type signal. Thus, the TT0 value is read out from a register 1004 and is compared with the value from a track type register 1006 at the summer 1007. The signal values are compared and the case where the values are equal is represented by the "=0" box numbered 1008. The "=0" outcome is provided as one of three inputs to a NOR gate 1010 that provides the write inhibit output.

The track type TT output 1006 also is compared with the TT1 signal from a TT1 register 1012 at the summer 1013 and the "=0" output for the condition TT1=TT is represented by the box 1014. The TT1=TT output is provided as one input to an AND gate 1016. The $TH_{HI}$ signal is received from a register 1018, and the PESRMP signal is received from another register 1020, and the two are compared in a summer 1022. The outcome of a "≧0" comparison 1024 between $TH_{HI}$ and PESRMP is provided as the other input to the AND gate 1016. The output of the AND gate is the second input to the NOR gate 1010.

The track type TT output 1006 is compared with the TT2 signal from a TT2 register 1026 at the summer 1028 and the "=0" output for the condition TT2=TT is represented by the box 1030. The TT2=TT output is provided as one input to an AND gate 1032. The $TH_{LO}$ signal is received from a register 1034 and the PESRMP signal is received from the register 1020, and the two are compared in a summer 1036. The outcome of a "≦0" comparison 1038 between $TH_{LO}$ and PESRMP is provided as the other input to the AND gate 1032. The output from the AND gate is the third input to the NOR gate 1010, which then provides the write inhibit output.

Figure 11:
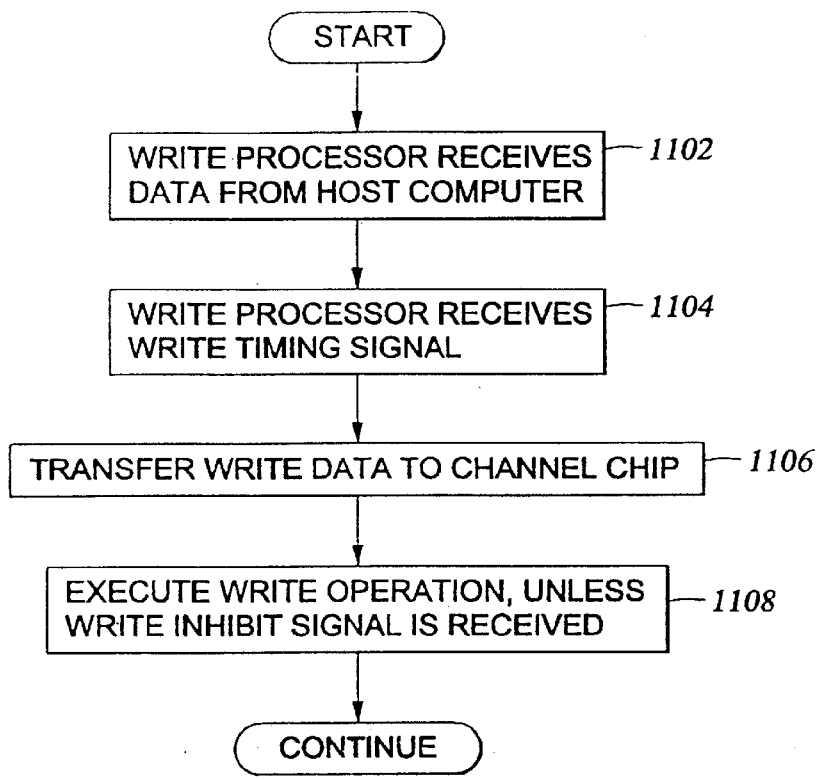
FIG. 11 is a flow diagram of the processing steps performed by the disk drive controller illustrated in FIG. 2.

FIG. 11 is a flow diagram of the processing steps performed by the disk drive controller illustrated in FIG. 2 for disk write operations. In the first step of write processing, represented by the flow diagram box numbered 1102, the write processor receives customer data from the host computer and formats the data, thereby preparing the data for writing to disk. In the next processing step, the write processor receives a timing signal from the servo controller. This step is represented by the flow diagram box numbered 1104. Next, the write processor transfers the data to the write circuit (also called the channel chip), as represented by the flow diagram box numbered 1106. Finally, the write circuit is gated by the write inhibit signal line from the write inhibit detection, so that no write operation occurs if the write inhibit signal is present. This processing is represented by the flow diagram box numbered 1108. If there is no write inhibit signal, then the write operation is executed.

Figure 12:
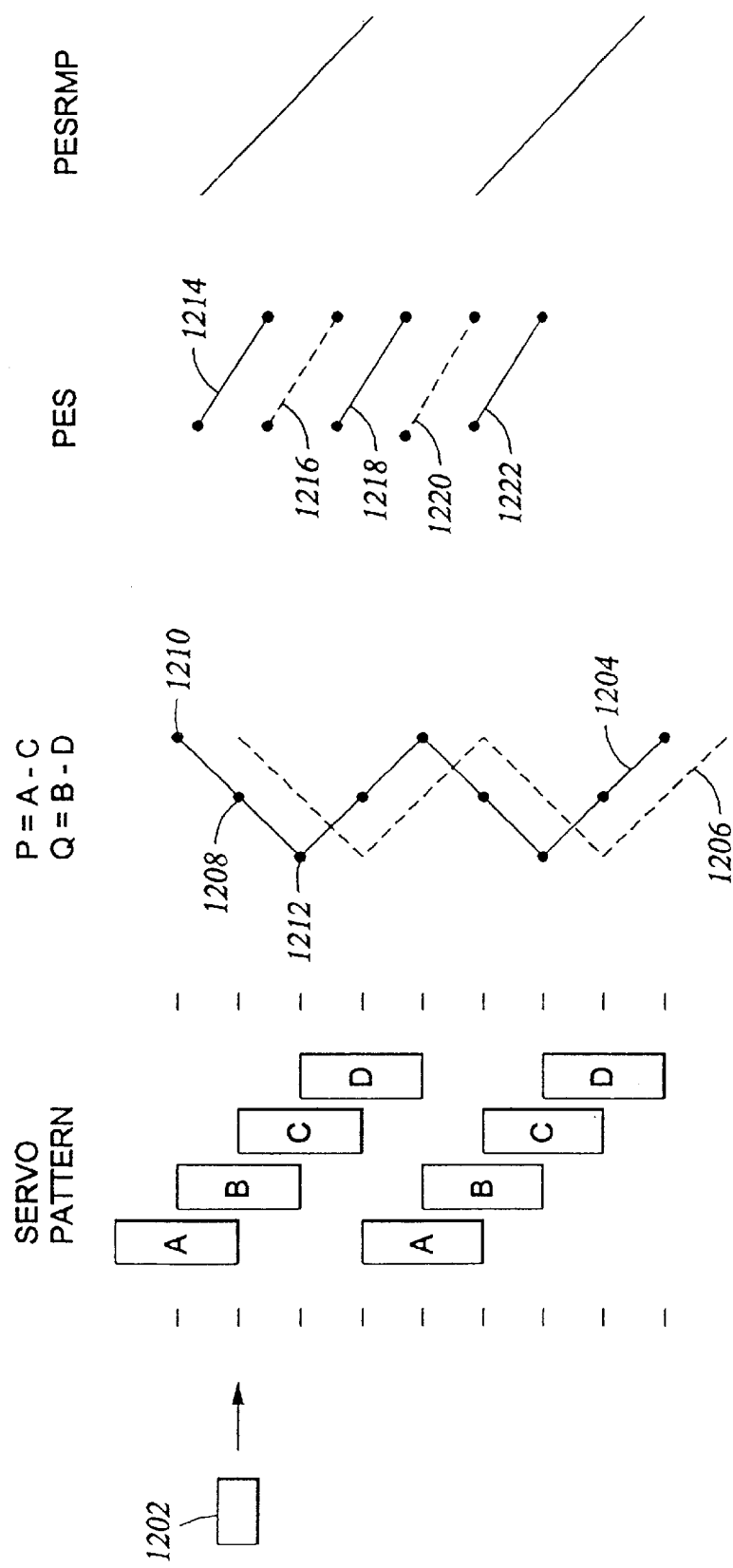
FIG. 12 is a diagram showing the quadrature PES servo pattern of the disk drive storage system of FIG. 2 and the corresponding values for P, Q, PES, and PESRMP generated by the servo controller.

FIG. 12 illustrates the signals produced by the servo controller of FIG. 2 for the quadrature servo pattern described. The read/write head 1202 generates the P and Q quadrature signals indicated, from which the position error sensing (PES) signal is produced. The P component is indicated with a solid line 1204 and the Q component is indicated with a dashed line 1206. Thus, for a read/write head 1202 that is tracking on the disk such that it is aligned exactly between the bottom of the A servo burst and top of the C servo burst, the demodulated P component of the PES signal corresponds to the indicated data point 1208. Those skilled in the art will understand that if the head 1202 were tracking through the middle of the A servo burst, the demodulated readback signal produced would correspond to the top data value 1210, and if the head were tracking through the middle of the C servo burst, the readback signal would correspond to the lower data value 1212. The Q signal is derived similarly as the head 1202 tracks through the B and D servo bursts.

Known techniques are used to derive the PES signal from the P and Q components of the readback signal. Those skilled in the art will understand that the P and Q components are stitched together to produce the stitched PES signal (also referred to as the PES ramp signal). Thus, the "PES" signal segments shown in FIG. 12 correspond to a –P segment 1214, a –Q segment 1216, a P segment 1218, a Q segment 1220, beginning over again with a –P segment 1222 and so forth. The stitched together PES ramp signal PES-RMP is illustrated to the far right edge of the drawing figure.

Figure 13:
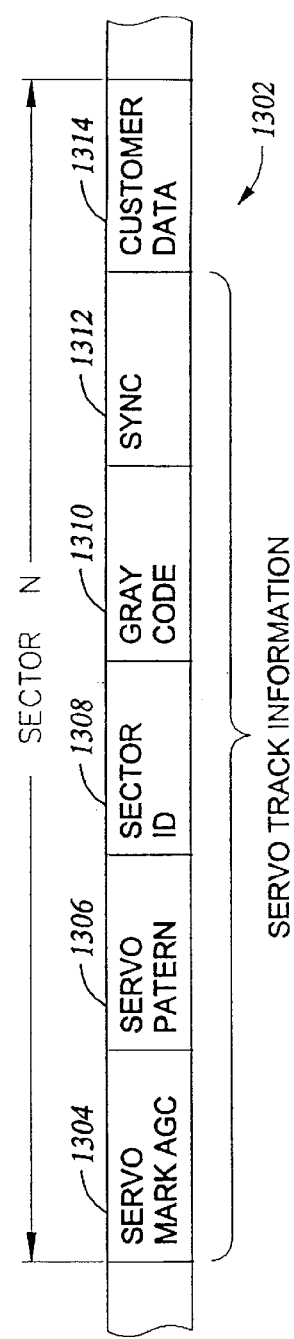
FIG. 13 is a schematic representation of a sector format for a track in the disk drive storage system of FIG. 2.

Configurations other than those described above are possible without departing from the features of the invention. For example, FIG. 13 is a schematic representation of a sector format for a track 1302 in a disk drive storage system constructed in accordance with the invention. In contrast to the FIG. 4 format, the format illustrated in FIG. 13 does not split the gray code into a low-order segment and a full segment. Rather, FIG. 13 provides a servo mark AGC field 1304, followed by the servo pattern 1306, then a sector ID field 1308, the full gray code 1310, and the sync field 1312. The servo track information is then followed by the customer data 1314. The FIG. 13 format shares in common with the FIG. 4 format the feature of positioning the servo pattern 1306 sufficiently from the end of the servo track information area that the readback signal can be processed and a write inhibit signal generated before any customer data write operations would begin for that sector. This ensures timely processing of the write inhibit decision for each sector.

Figure 14:
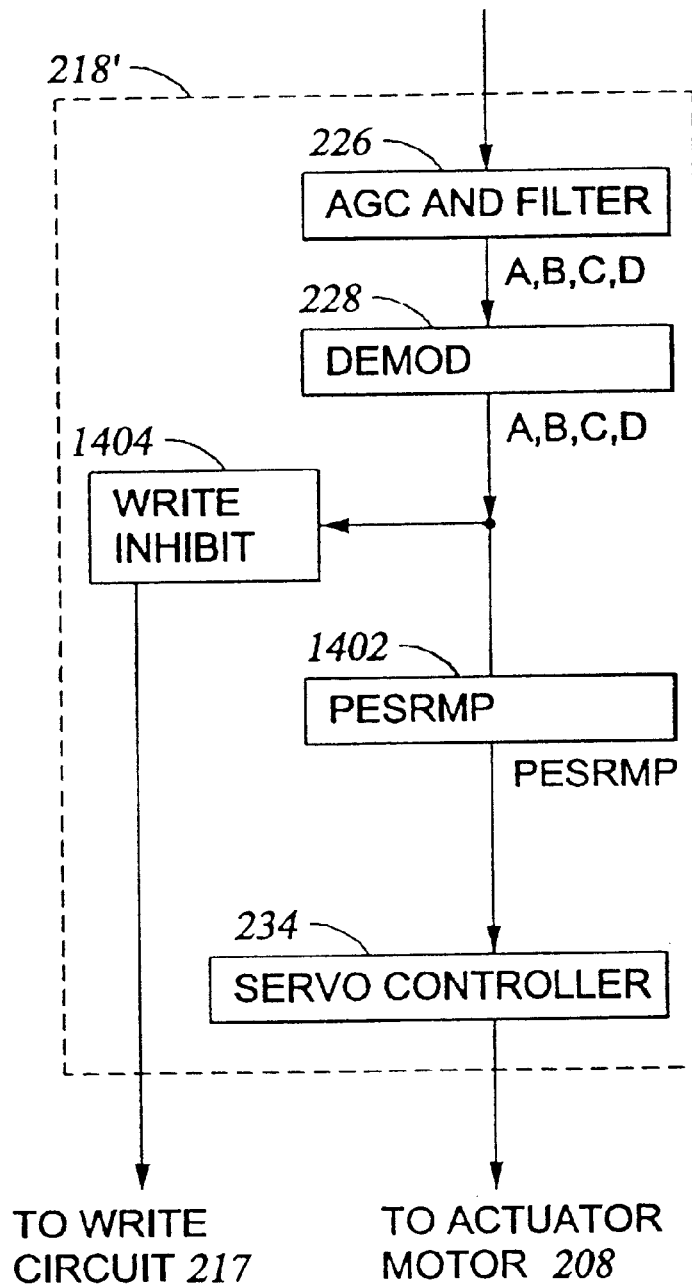
FIG. 14 is a block diagram of an alternative servo channel configuration that can be used in the DASD of FIG. 2.

Another alternative configuration is shown in FIG. 14, which is a block diagram representation of an alternative servo channel 218' configuration that can be used in place of the servo channel 218 shown in the DASD of FIG. 2. The FIG. 14 embodiment differs from the FIG. 2 embodiment in having a different arrangement of PES and TT processing. Like reference numerals between the two drawing figures refer to like structures.

In FIG. 14, the digital A, B, C, D servo burst values are provided to a PESRMP decode circuit 1402 and also to a write inhibit detection circuit 1404. The write inhibit detection circuit receives the servo burst values and produces a track type (TT) signal. Appropriate circuitry (not illustrated) of the write inhibit detection places the received servo information in the proper register of a register bank 1404, with a different register for each A, B, C, and D value. The servo burst values also are provided to a PESRMP circuit 1402 that produces the PESRMP signal. Those skilled in the art will appreciate that the construction and processing within the PES write inhibit detection will be similar to that of the construction and processing shown in FIGS. 6 and 7 with respect to the PESRMP values.

Figure 15:
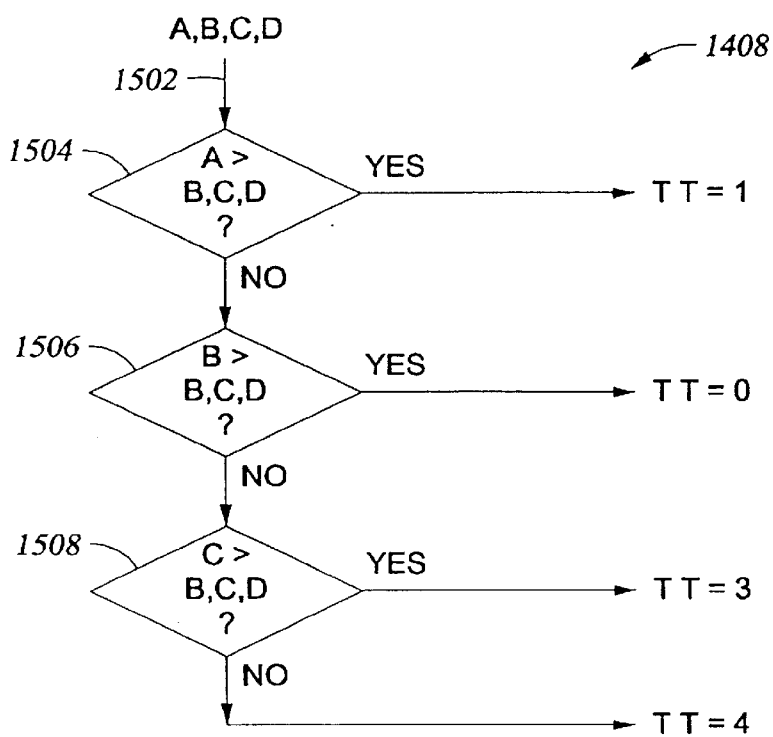
FIG. 15 is a block diagram representation of the processing performed by the write inhibit circuit illustrated in FIG. 14.

FIG. 15 illustrates the processing performed by the TT write inhibit detection circuit 1404 of FIG. 14. The circuit functioning illustrated in FIG. 15 utilizes the fact that the track type decision can be made independently of determining the PESRMP values. That is, for the configuration illustrated in which there are four servo pattern bursts A, B, C, and D, and in which the servo signal is derived from P=A–C and Q=B–D, the track type decision can be made immediately upon knowing the A, B, C, and D values. Those skilled in the art will appreciate that this is apparent from inspection of FIG. 12. Accordingly, FIG. 15 shows that the write inhibit detection circuit 1404 receives the servo information signal 1502 and checks to determine if the A servo burst generated the largest magnitude, as represented by the decision box numbered 1504. If the largest burst was the A burst, an affirmative outcome at the decision box 1504, then the TT decode circuit will indicate a track type of "TT=1".

If A was not the largest burst, a negative outcome, then the TT decode circuit checks the other servo burst values. If B was the largest burst, then the TT decode circuit will indicate a track type of "TT=0", as represented by the decision box numbered 1506. If C was the largest servo information burst, then the TT decode circuit will indicate a track type of "TT=3", as represented by the decision box numbered 1508. Finally, if D was the largest burst, then the TT decode circuit will indicate a track type of "TT=2". It should be understood that the sequence of processing illustrated in FIG. 15 can be changed, so long as the appropriate track type values are produced by the circuit 1404. Similarly, a digital implementation is described, but those skilled in the art will recognize that, if desired, the analog servo information signal can be processed rather than the digital signal to produce the track type values. In either case, the present invention permits initiating and terminating a write inhibit decision quickly, without typical processing delays incurred if the write channel first determines the head-to-track-centerline distance before making the write inhibit decision.

The present invention has been described above in terms of a presently preferred embodiment so that an understanding of the present invention can be conveyed. There are, however, many configurations for disk drive controllers not specifically described herein but with which the present invention is applicable. The present invention should therefore not be seen as limited to the particular embodiments described herein, but rather, it should be understood that the present invention has wide applicability with respect to disk drive controllers generally. All modifications, variations, or equivalent arrangements and implementations that are within the scope of the attached claims should therefore be considered within the scope of the invention.

We claim:

1. A direct access storage device (DASD) comprising:

a storage media with multiple storage tracks on a media surface, each of the storage tracks arranged into a plurality of sectors that include a servo mark field, a servo pattern field, a track identification field, and a customer data field;

a demodulator that receives a track readback signal from a transducing head and demodulates servo pattern data transduced from the servo pattern field of a sector to produce servo information comprising servo burst values of the servo pattern field;

a digital servo controller that receives a position error sensing (PES) signal computed from the servo information such that the PES signal indicates position of the transducing head relative to the center of the track, and controls an actuator motor that positions the transducing head; and a write inhibit detection circuit that receives the servo information for the sector and generates a write inhibit signal independently of the digital servo controller, such that the write inhibit signal prevents write operations from taking place for the sector, wherein the write inhibit detection circuit generates the write inhibit signal if a determined track type does not match a target track type for a desired destination track.

2. A DASD as defined in claim 1, wherein the write inhibit detection circuit receives the servo burst values and in response generates the write inhibit signal.

3. A DASD as defined in claim 1, wherein the write inhibit detection circuit generates the write inhibit signal if the servo burst values indicate that the transducing head position relative to the track center exceeds a predetermined error threshold.

4. A DASD as defined in claim 1, wherein the write inhibit detection circuit determines the track type for the track sector from the servo burst values.

5. A DASD as defined in claim 1, wherein the write inhibit detection circuit generates the write inhibit signal after the servo pattern field data is demodulated for the track sector and before any write operations are commenced for the track sector.

6. A DASD as defined in claim 1, wherein the write inhibit detection circuit generates the write inhibit signal independently of quadrature position information contained in the PES signal.

7. A DASD as defined in claim 6, further including PES ramp circuitry that produces position data and track type circuitry that produces track type data.

8. A servo control system for a direct access storage device (DASD), the servo control system comprising:
a demodulator that receives a track readback signal from a transducing head of the DASD that transduces data written into multiple storage tracks on a DASD media surface such that each of the storage tracks is arranged into a plurality of sectors that include a servo mark field, a servo pattern field, a track identification field, and a customer data field, wherein the demodulator demodulates the servo pattern field data transduced from the servo pattern field of a sector to produce servo information comprising servo burst values of the servo pattern field;
a digital servo controller that receives a position error sensing (PES) signal computed from the servo information such that the PES signal indicates position of the transducing head relative to the center of the track, and controls an actuator motor that positions the transducing head; and
a write inhibit detection circuit that receives the servo information for the sector and generates a write inhibit signal independently of the digital servo controller, such that the write inhibit signal prevents write operations from taking place for the sector, wherein the write inhibit detection circuit generates the write inhibit signal if a determined track type does not match a target track type for a desired destination track.

9. A servo as defined in claim 8, wherein the write inhibit detection circuit receives the servo burst values and in response generates the write inhibit signal.

10. A servo control system as defined in claim 8, wherein the write inhibit detection circuit generates the write inhibit signal if the servo burst values indicate that the transducing head position relative to the track center exceeds a predetermined error threshold.

11. A servo control system as defined in claim 8, wherein the write inhibit detection circuit determines the track type for the track sector from the servo burst values.

12. A servo control system as defined in claim 8, wherein the write inhibit detection circuit generates the write inhibit signal after the servo pattern field data is demodulated for the track sector and before any write operations are commenced for the track sector.

13. A servo control system as defined in claim 8, wherein the write inhibit detection circuit generates the write inhibit signal independently of quadrature position information contained in the PES signal.

14. A servo control system as defined in claim 13, further including PES ramp circuitry that produces position data and track type decode circuitry that produces track type data.

15. A method of controlling write operations in a direct access storage device (DASD), the method comprising the steps of:
receiving a track readback signal from a transducing head of the DASD that transduces data written into multiple storage tracks on a DASD media surface such that each of the storage tracks is arranged into a plurality of sectors that include a servo mark field, a servo pattern field, a gray code field, and a customer data field;
receiving servo pattern data transduced from the servo pattern field of a DASD sector and demodulating the servo pattern data to produce servo information comprising servo burst values of the servo pattern field;
receiving a position error sensing (PES) signal that indicates position of the transducing head relative to the center of the track, and controlling an actuator motor and positions the transducing head; and
receiving the servo information for the sector and generating a write inhibit signal independently of producing the position signal, such that the write inhibit signal prevents write operations from taking place for the sector, wherein the step of generating a write inhibit signal comprises determining a track type for the track sector corresponding to the track readback signal and generating the write inhibit signal if the determined track type does not match a target track type for a desired destination track.

16. A method as defined in claim 15, wherein the step of generating a write inhibit signal comprises receiving the servo burst values and in response generating the write inhibit signal.

17. A method as defined in claim 15, wherein the step of generating a write inhibit signal comprises generating the write inhibit signal if the servo information indicates that the transducing head position relative to the track center exceeds a predetermined error threshold.

18. A method as defined in claim 15, wherein the track type is determined for the track sector from the servo burst values.

19. A method as defined in claim 15, wherein the write inhibit signal is generated after the servo pattern field data is demodulated for the track sector and before any write operations are commenced for the track sector.

20. A method as defined in claim 15, wherein the write inhibit signal is generated independently of quadrature position information contained in the PES signal.

21. A method as defined in claim 20, wherein the step of controlling the actuator motor comprises generating a PES ramp signal in a PES ramp circuit, and the step of generating the write inhibit signal comprises generating a track type signal in a track type write inhibit detection circuit.

22. A direct access storage device (DASD) comprising a storage media with multiple storage tracks on a media surface, each of the storage tracks arranged into a plurality of sectors that include a servo mark field, a servo pattern field, a gray code field, and a customer data field, wherein the servo pattern field is located in a track sector prior to the servo mark field, and wherein the DASD includes a demodulator that receives a track readback signal from a transducing head and produces servo information comprising servo burst values of the servo pattern field, and includes a servo controller that receives a position error sensing (PES) signal computed from the servo information such that the PES signal indicates position of the transducing head relative to the center of the track, such that the servo controller controls an actuator motor that positions the transducing head, and further includes a write inhibit detection circuit that generates a write inhibit signal that prevents write operations from taking place for the sector if the transducing head position relative to the track center exceeds a predetermined error threshold, wherein the position of the transducing head relative to the track center is determined, at least in part, based upon a determined track type as compared with a target track type.

23. A DASD as defined in claim 22, further including a demodulator that receives the track readback signal, demodulates servo pattern field data transduced from the servo pattern field of a sector, and produces servo information comprising servo burst values of the servo pattern field, and the write inhibit detection circuit receives the servo information for the sector and generates a write inhibit signal independently of the digital servo controller, such that the write inhibit signal prevents write operations from taking place for the sector.

24. A DASD as defined in claim 23, wherein the write inhibit detection circuit receives the servo burst values and in response generates the write inhibit signal.

25. A DASD as defined in claim 22, wherein the write inhibit detection circuit determines the track type for the track sector from the servo burst values.

26. A DASD as defined in claim 22, wherein the write inhibit detection circuit generates the write inhibit signal after the servo pattern field data is demodulated for the track sector and before any write operations are commenced for the track sector.

27. A DASD as defined in claim 22, wherein the write inhibit detection circuit generates the write inhibit signal independently of quadrature position information contained in the PES signal.

28. A DASD as defined in claim 27, further including PES ramp circuitry that produces position data and track type circuitry that produces track type data.

* * * * *